(12) United States Patent
Mukhopadhyay et al.

(10) Patent No.: US 10,901,882 B1
(45) Date of Patent: Jan. 26, 2021

(54) AUTOMATED DETERMINATION OF SOFTWARE TESTING RESOURCES

(71) Applicants: Saibalesh Mukhopadhyay, New York, NY (US); Shailendra Mishra, Lawrenceville, NJ (US)

(72) Inventors: Saibalesh Mukhopadhyay, New York, NY (US); Shailendra Mishra, Lawrenceville, NJ (US)

( * ) Notice: Subject to any disclaimer, the term of this patent is extended or adjusted under 35 U.S.C. 154(b) by 0 days.

(21) Appl. No.: 16/881,891

(22) Filed: May 22, 2020

(51) Int. Cl.
*G06F 11/36* (2006.01)
*G06F 11/30* (2006.01)
*G06F 11/34* (2006.01)

(52) U.S. Cl.
CPC ........ *G06F 11/3688* (2013.01); *G06F 11/302* (2013.01); *G06F 11/3457* (2013.01); *G06F 11/3684* (2013.01); *G06F 11/3692* (2013.01)

(58) Field of Classification Search
CPC .... G06F 11/36; G06F 11/3688; G06F 11/302; G06F 11/3457
See application file for complete search history.

(56) References Cited

U.S. PATENT DOCUMENTS

| | | | |
|---|---|---|---|
| 8,893,086 B2 | 11/2014 | Bassin et al. | |
| 9,330,365 B2 | 5/2016 | Bhattacharyya et al. | |
| 10,025,698 B2 | 7/2018 | Shah et al. | |
| 10,114,738 B2 | 10/2018 | Dsouza | |
| 10,127,134 B2 | 11/2018 | Jayaraman et al. | |
| 10,282,281 B2 | 5/2019 | Mallya | |
| 10,282,283 B2 | 5/2019 | Finger et al. | |
| 10,354,210 B2 | 7/2019 | Kour et al. | |
| 2015/0286556 A1* | 10/2015 | Ellis | G06F 11/3664 717/125 |
| 2016/0307133 A1* | 10/2016 | Kour | G06Q 10/06313 |
| 2017/0277592 A1* | 9/2017 | Wilson | G06F 30/00 |
| 2019/0243751 A1 | 8/2019 | Madhusudhan et al. | |

OTHER PUBLICATIONS

Testrail, "Comprehensive Test Case Management for Your Team", Retrieved from the Internet Aug. 9, 2019: https://www.gurock.com/testrail/tour/modern-test-management, pp. 1-14.

\* cited by examiner

*Primary Examiner* — Ziaul A Chowdhury
(74) *Attorney, Agent, or Firm* — Farber LLC

(57) ABSTRACT

Systems and methods are disclosed that determine a duration and resources for testing software. In some implementations, the system performs operations including determining functions performed by applications of the software product, and determining categories based on the functions, the categories including a lowest-criticality category and a highest-criticality category. The operations also include determining degrees of change to the applications and test scripts corresponding to the degrees of change. The operations also include generating a data structure based on the categories and the degrees of change, the data structure including columns identifying the categories in an order from lowest to highest criticality. The operations also include determining weights corresponding to distances of the categories from the highest-criticality category. The operations also include determining a set of test scripts based on the weights, the test scripts, and the degree of change indicators, and determining the resources based on the set of test scripts.

16 Claims, 7 Drawing Sheets

AUTOMATED DETERMINATION OF SOFTWARE TESTING RESOURCES

BACKGROUND

Software testing verifies that software products function as intended. Testing may be performed at various times over the lifecycle of a software product. For example, a new software product may be tested before it is released to users, and an existing software product may be tested after it is modified or updated. Testing an existing software product can include "regression testing," which verifies that modifications to one part of the software have not negatively affected unmodified parts. For example, regression testing may confirm that a new user-interaction function of a user interface application does not cause errors in a reporting function of a posting application using information derived from the user-interaction.

The scope of software testing can increase exponentially with the size of a software product. As such, testing large software platforms can consume vast amounts of computing resources (e.g., processing cycles, memory, storage, power, etc.). Indeed, entirely retesting a large software product may be impractical because doing so can consume computing resources that affect current operations.

Software engineers may attempt to limit the scope of testing to portions of the software product affected by the modification or update. However, in many cases, software engineers merely make educated guesses as to the scope of testing based on available time and resources, rather than using a technical solution. Performing testing based on such ad hoc estimates inefficiently consumes computing resources. In addition, doing so can result in poor quality results, for example, by insufficiently testing some applications and unnecessarily testing other applications. Moreover, ad hoc planning is often based on opaque choices that limit the effectiveness of post-test review and revision of the test scope. Accordingly, there is need for a technical solution for automatically determining the scope of software testing.

SUMMARY

Systems and methods are disclosed that determine duration and resources for testing software. In some implementations, the system performs operations including determining functions performed by applications of the software product, and determining categories based on the functions, the categories including a lowest-criticality category and a highest-criticality category. The operations also include determining degrees of change to the applications and associated test scripts corresponding to the degrees of change. The operations also include generating a data structure based on the categories and the degrees of change, the data structure including columns identifying the categories in an order from lowest to highest criticality of applications. The operations also include determining weights corresponding to distances of the categories from the highest-criticality category. The operations also include determining a set of test scripts based on the weights, the test scripts, and the degree of change indicators, and determining the resources based on the set of test scripts.

DRAWINGS

The present invention will become more fully understood from the detailed description and the accompanying drawings, wherein.

DETAILED DESCRIPTION

Figure 1:
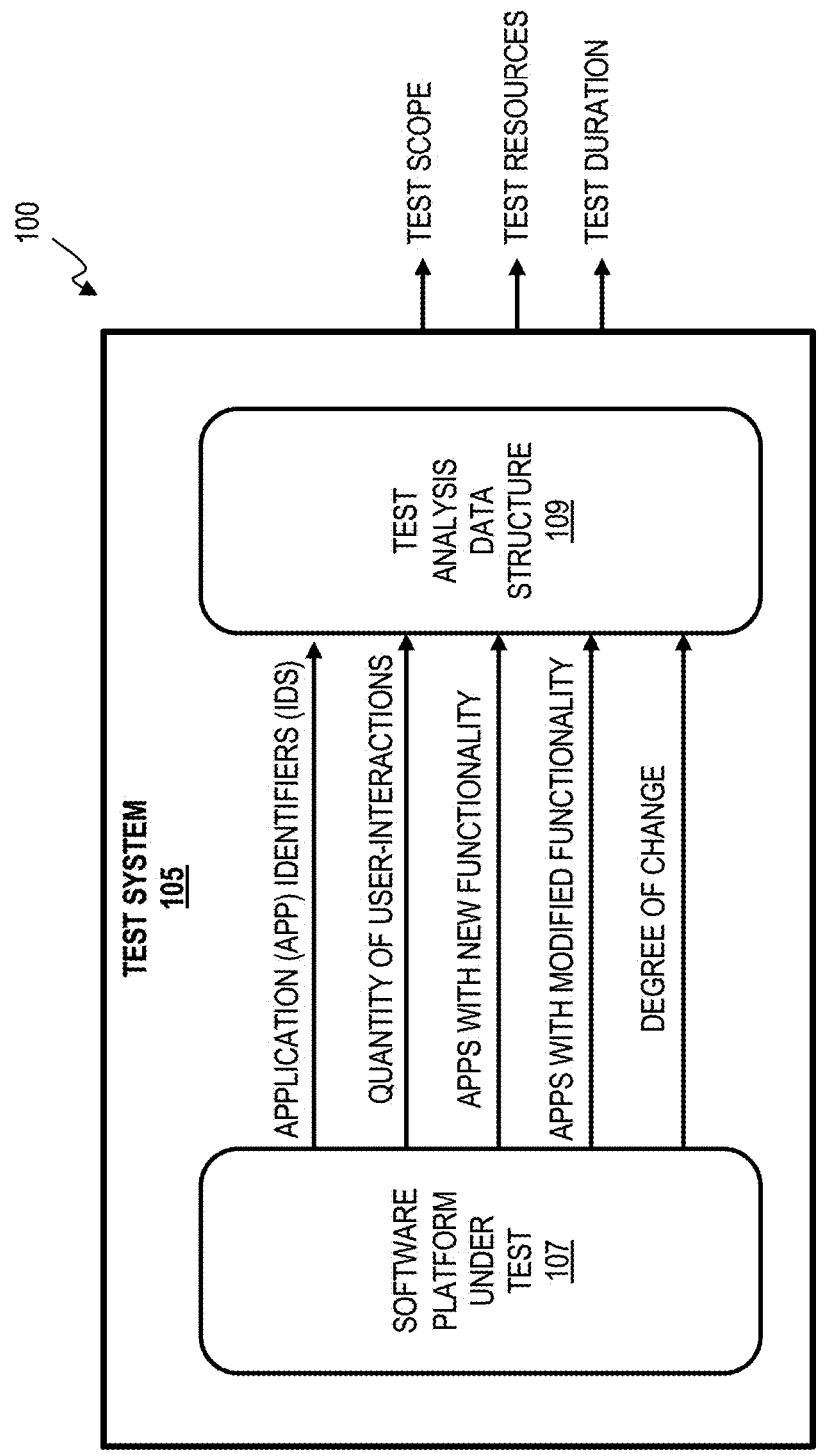
FIG. 1 shows a system block diagram illustrating an example of an environment for implementing systems and processes in accordance with aspects of the present disclosure.

The present disclosure is generally directed to software testing, and more particularly, to systems, methods, and computer program products for determining software test scope. Implementations of the systems, methods, and computer program products consistent with the present disclosure can automatically determine scope, resources, and duration for testing a software product. In some implementations, the testing involves user acceptance testing of an information management platform comprised of a large number of applications.

In accordance with aspects of the present disclosure, the systems, methods, and computer program products analyze the applications in the software product to generate a data structure particular to software product and having an arrangement logically relating the applications with testing information. In some implementations, the data structure relates the applications of the software product with an identifier, a category, a change indicator, and a degree of change (e.g., small, medium, and large). The logical relationships of the data structure arrange categories according to their criticality to the software product. Using the relationships defined by the logical arrangement of the data structure, the systems, methods, and computer program products disclosed herein can efficiently determine a scope, resources, and duration for testing of a software product using weights assigned to the categories based on different distances of the categories in the data structure from the applications categorized as most-critical.

In accordance with aspects of the present disclosure, the weights of the categories increase from a lowest-weight category, including least-critical applications, to a greatest-weight category, including most-critical applications. In implementations, the criticality of an application corresponds to a risk that an error in the application would cause a failure of a core or vital function of the software product. Applications that are most-critical may be ones in which errors would certainly or very likely cause the failure of a core or vital function. Applications that may be least critical are ones in which errors would certainly or very likely not cause a failure in any core or vital function. For example, in a banking software platform for which providing accurate account information is a core function, a posting application that generates reports from a customer account database can be categorized as most-critical. Whereas, a user-interface application that is isolated from the customer account database can be categorized as a least-critical. Other applications can be categorized over a range between the least-critical and the most-critical applications.

In some applications, the categories distinguish between front-end applications and back end applications. For categories of front-end applications, the weights can linearly increment in the data structure from a first, lowest-criticality category having a weight of 1, to a second, more critical category, category having a weight of 2, to a third, even more critical category having a weight of 3, to a fourth category, greater criticality category having a weight of 4, to a fifth, highest-criticality category having a weight of 5. Additionally, for categories of back-end applications, the weights can linearly decrease from the fifth, highest-criticality category to a sixth, less critical category having a weight of 4, to a seventh, even less critical category having a weight of 3, to an eight, even less critical category having a weight of 2, to a ninth category, lowest-criticality category having a weight of 1. As such, the applications in the highest-criticality category correspond to the greatest weight among the front-end and back-end applications. While the present example uses nine categories, it is understood that some implementations can include fewer or greater quantities of categories. For example, a data structure can include greater than 20 categories so as to provide more granular differentiation of criticality and weights than a data structure having fewer categories. Further, in some implementations, the distribution of applications in the categories can represent a normal curve centered on the most-critical applications.

Reference will now be made in detail to specific implementations illustrated in the accompanying drawings and figures. In the following detailed description, numerous specific details are set forth to provide a thorough understanding of the invention. However, it will be apparent to one of ordinary skill in the art that implementations may be practiced without these specific details. In other instances, well-known methods, procedures, components, circuits, and networks have not been described in detail so as not to unnecessarily obscure aspects of the implementations.

FIG. 1 shows a block diagram illustrating an example of an environment 100 for implementing systems, methods, and computer program products in accordance with aspects of the present disclosure. The environment 100 can include a test system 105 including software platform under test 107 and a test and analysis data structure 109. The test system 105 includes a computing device that determines the test analysis data structure 109 based on the software platform under test 107. Further, the test system can determine a test scope, resources, and duration using the test analysis data structure 109.

The software platform under test 107 can be a software product including various applications. In some implementations, the software product is an information management system supporting operations of a large entity. For example, the entity can be a large bank and the information management system can include applications performing functions, such as: interfacing with customers, customer service representatives, users, and vendors; storing and retrieving information in databases and other information repositories; analyzing, coordinating, and visualizing information; generating invoices, financial statements, and other such reports; detecting fraud; and evaluating legal and regulatory compliance. In some implementations, the software platform under test 107 includes a large quantity of applications such that it is impractical for a human to determine a scope for testing the software platform under test 107. For instance, some implementations of the software platform under test 107 may include more than 50 applications And, and some implementations can include more than 100 applications. Further, the applications can be associated with more than ten-thousand test scripts (e.g., forty to fifty-thousand test scripts). In accordance with aspects of the present disclosure, one or more applications of the software platform under test 107 are dependent on another. As such, modifying a first application can cause errors or failures of a second application that was not modified. In some implementations, the software platform under test 107 can be an updated or modified version of an existing software product (e.g., a previously-released software product). It is understood that the term application can include software programs, modules, objects, scripts or the like.

The test analysis data structure 109 can be a task-specific data structure, such as a database or a spreadsheet, logically relating information describing applications of the software platform under test 107 to provide a tool by which a test system can automatically and efficiently determine a test scope, resources, and duration. As illustrated in FIG. 1, the information obtained can include identifiers of the applications included in the software platform under test 107, quantities of user-interactions performed by the individual applications, identifications of applications including new functionality, identifications of applications having modified functionality, and a degree of change made to the individual applications (if any). The test analysis data structure 109 has a particular structure used by the test system 105 to determine test scope and resources in accordance with aspects of the present disclosure. As detailed below, the test analysis data structure 109 logically relates the applications of the software platform under test 107 in categories based on types of functions performed by the applications. The categories can include types of functions, such as, inputs, storage, conversion, analysis, reporting, and outputs (e.g., postings). The distance between the categories of applications included in the test analysis data structure 109 define an ordered set of information arranging the applications from those that are least critical (e.g., user-interface applications) to applications that are most critical (e.g., outputs posting applications). Each category of application can include one or more different types of applications.

The test system 105 can determine the scope, resources, and duration for testing the software platform under test 107 using the test analysis data structure 109. In some implementations, determining the scope includes determining an optimal quantity of test scripts to execute during testing using available resource and time-schedule constraints. In accordance with aspects of the present disclosure, the test system 105 can determine the quantity of test scripts based on the weights assigned to the categories in the test analysis data structure 109 using their relative positions in the data structure. In some implementations, the quantity of test scripts is based on the quantity of new scripts used to test new functionality added to one or more of the applications and the quantity of regression scripts to test modifications to one or more of the applications.

Figure 2A:
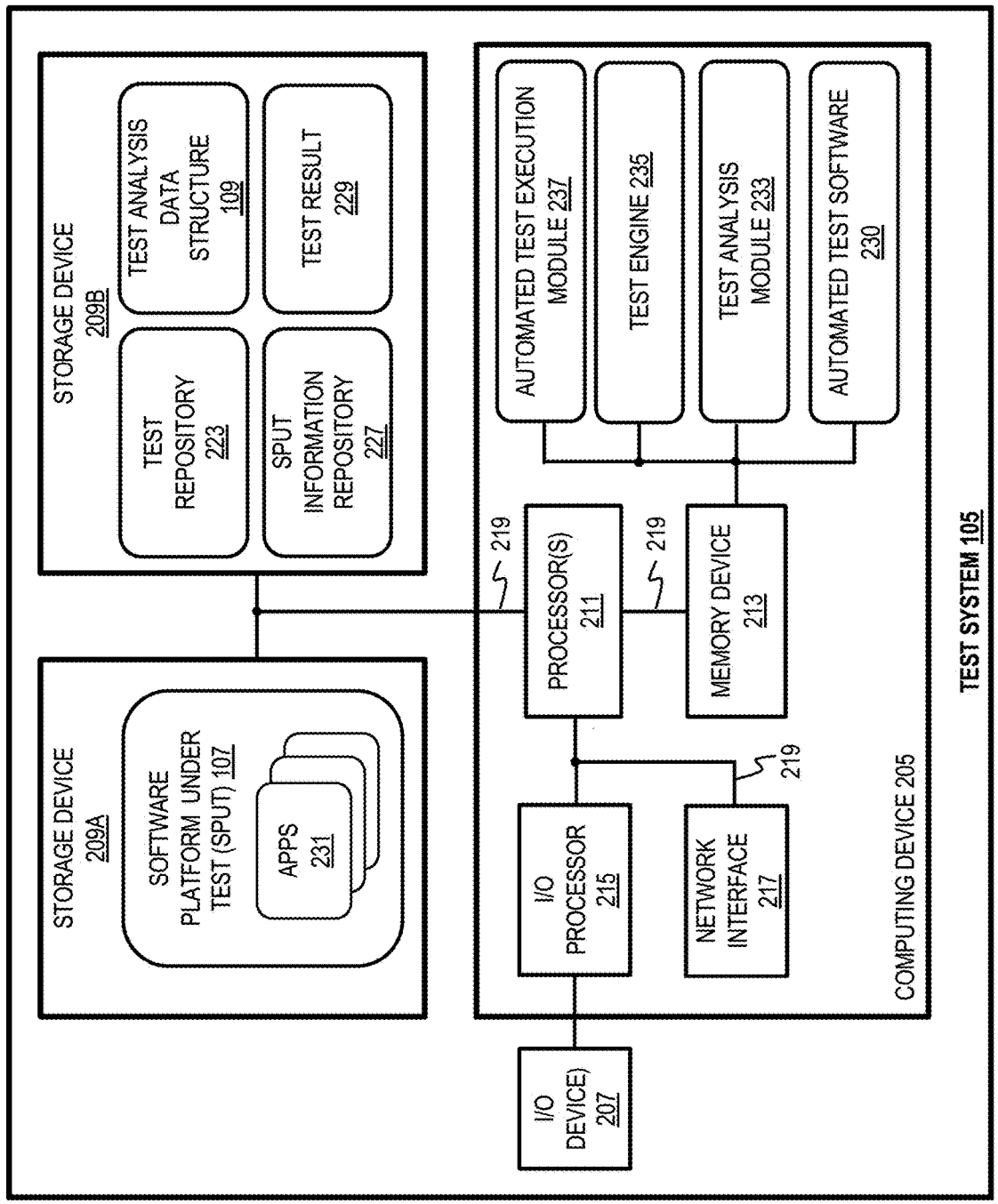
FIG. 2A shows a system block diagram illustrating an example of a test system in accordance with aspects of the present disclosure.
Figure 2B:
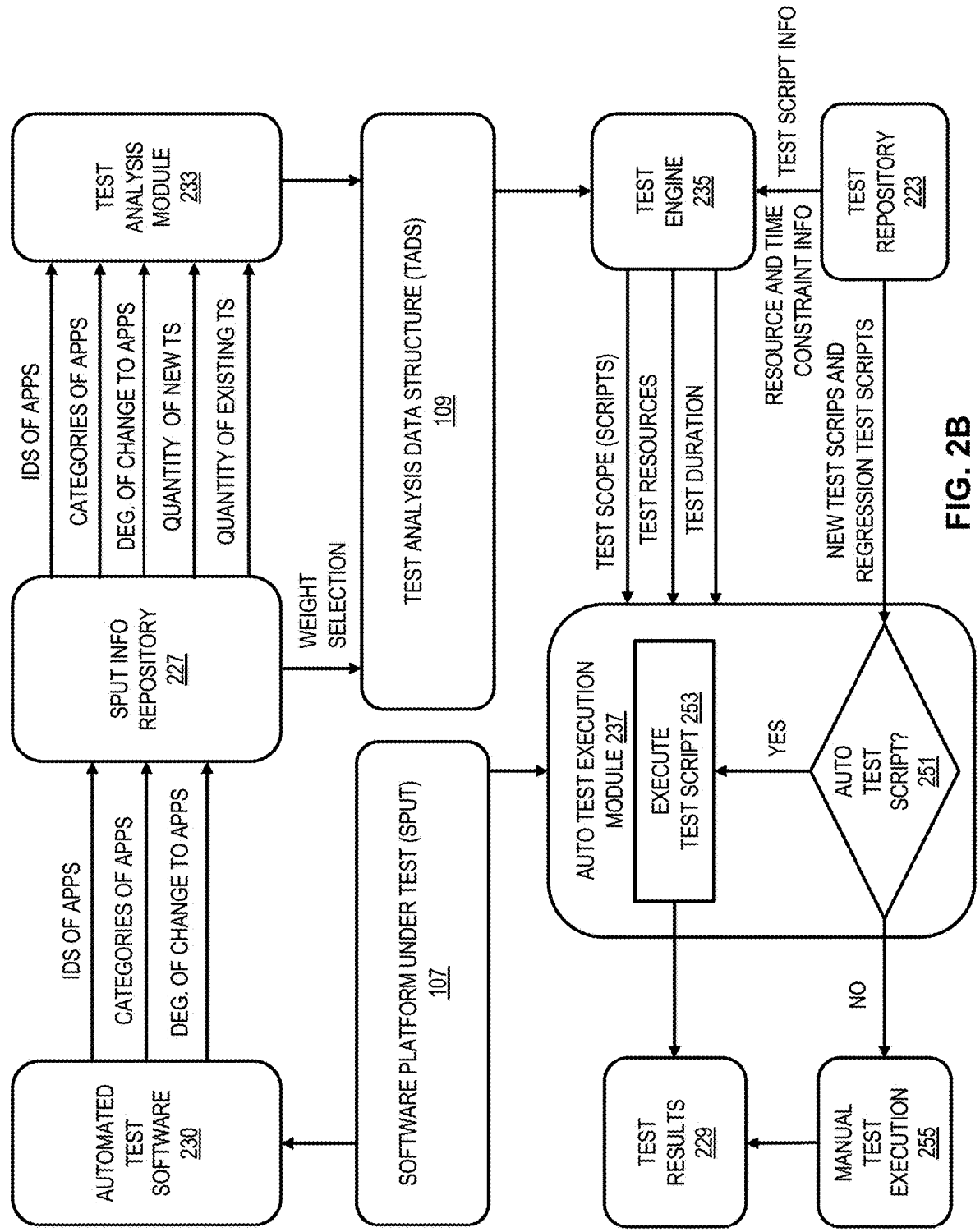
FIG. 2B shows a functional flow block diagram illustrating an example of a test system in accordance with aspects of the present disclosure.

FIG. 2A shows a system block diagram illustrating an example of a test system 105, which can be the same or similar to that described above. FIG. 2B shows a functional flow block diagram illustrating an example of the test system 105 in accordance with aspects of the present disclosure As illustrated in FIG. 2A, the test system 105 includes hardware and software that perform the processes and functions disclosed herein. In some implementations, the test system 105 includes a computing device 205, one or more input/ output (I/O) devices 207, and storage systems 209A and 209B. For example, the test system 105 can be one or more mainframes, servers, personal computers, or other suitable computing devices.

In implementations, the computing device 205 can include one or more processors 211 (e.g., microprocessor, microchip, or application-specific integrated circuit), one or more memory devices 213 (e.g., random-access memory and/or read-only memory), an I/O processor 215, and a network interface 217. The memory devices 213 can include a local memory (e.g., a random-access memory and a cache memory) employed during execution of program instructions. Additionally, the computing device 205 can include at least one communication channel 219 (e.g., a data bus) by which it communicates with the storage systems 209A and 209B, I/O processor 215, and the network interface 217. It is noted that the computing device 205 can comprise any general-purpose computing article of manufacture capable of executing computer program instructions installed thereon (e.g., a personal computer, server, etc.). However, the computing device 205 is only representative of various possible computing devices that can perform the processes described herein. To this extent, in embodiments, the functionality provided by the computing device 205 can be any combination of general and/or specific purpose hardware and/or computer program instructions. In each embodiment, the program instructions and hardware can be created using standard programming and engineering techniques.

The storage systems 209A and 209B can comprise computer-readable, non-volatile hardware storage devices that store information and program instructions. For example, the storage systems 209A and 209B can be one or more flash drives, hard disk drives, or other suitable storage devices.

The I/O device 207 can include one or more devices that enable an individual to interact with the computing device 205 (e.g., a user interface) and/or any device that enables the computing device 205 to communicate with one or more other computing devices using any type of communications link. The I/O device 207 can be, for example, a touchscreen display, pointer device, keyboard, etc. The network interface 217 can include any device interconnecting the computing device 205 with an information network (e.g., a local area network, a wide area network, and the Internet) enabling the test system 105 to communicate with other computing systems and information storage systems.

In accordance with aspects of the present disclosure, the storage system 209A can store the software platform under test 107 and the storage system 209B can store the test analysis data structure 109, a test repository 223, a software platform under test information repository 227, and test results 229. The software platform under test 107 and the test analysis data structure 109 can be the same or similar to those previously described above. Further, as illustrated in FIG. 2A, the software platform under test 107 can include applications 231, which can be the same or similar to those described above. The test repository 223 can store test scripts and test resource information. In some implementations, the test scripts correspond to the applications of the software platform under test 107. A test script is a set of program instructions that can be executed by the test system 105 (e.g., using an automated test execution 237) to test that the applications 231 of the software platform under test 107 function as expected and to detect errors and conflicts. For example, a test script for a user interface can define steps for inputting one or more user-interactions, define one or more correct or incorrect outputs corresponding to the user-interactions, and report errors up detecting an incorrect output. In some implementations, software engineers generate the test scripts for the applications. Additionally, in some implementations, an automated test software can generate test scripts for the software platform under test.

The test resource information stored by the test repository 223 can include information associated with the individual test scripts indicating resources and schedule constraints involved in executing the test scripts (manually or automatically). For example, the test script library can indicate that a test script for a posting application may use four hours testing, one workstation, and one test engineer. Additionally, the resource information can include information indicating human, computing, and schedule resources available for executing the test scripts. The human resources can include, for example, a quantity of test engineers available to implement the test scripts. The computing resources can include computers, processors, and/or computing cycles available to execute the test scripts. The schedule resources can include a deadline for completing the testing, availability time-windows for the test engineers, testers, and computing resources.

The software platform under test information repository 227 is a library of information describing the applications 231 in the software platform under test 107. The information included in the software platform under test information repository 227 can include application identifiers, information indicating the applications 231 having new functionality, information indicating applications 231 having modified functionality, and information indicating a degree of change to the individual applications 231 due to the new and modified functionality. In some implementations, the information in the software platform under test information repository 227 can be provided by software engineers, such as application developers, and by automated testing software. For example, a software engineer responsible for updating or modifying an application can maintain change information for that application that identifies the application, indicates whether one or more changes to the application has been made, indicates whether the change includes new and/or modified functionality, and indicates the degree of the changes (e.g., a small, medium, or large impact). Information indicating the degrees of change can include identifying other applications upon with the application depends and other applications that depend from the application. In some implementations, the software engineer may also indicate a relative criticality of the application (e.g., lowest, low, medium, high, or highest, or other suitable rankings).

The test results 229 can be an output generated by the test system 105 indicating the applications 231 that passed and failed testing. In some implementation, the test results 229 include identifiers of the applications tested, categories of the applications, identification of the respective test scripts the applications passed and failed, and indications of the failures.

While FIG. 2A illustrates the software platform under test 107, the test and analysis data structure 109, the test repository 223, and the software platform under test information repository 227 as being stored locally by the storage systems 209A and 209B, it is understood that some or all of this information can be stored remotely and accessed by the test system 105 using the network interface 217. For example, storage device 209A, including the software platform under test 107 and applications 231, can be maintained on one or more storage systems separate from the test system 105.

The processor 211 executes computer program instructions (e.g., an operating system and/or application programs), which can be stored in the memory device 213 and/or the storage system 209B. The processor 211 can also execute computer program instructions for automated test software 230, a test analysis module 233, a test engine 235, and an automated test execution 237. As illustrated in FIG. 2B, in some implementations, the automated test software 230 can be program instructions that automatically generate information included in the software platform under test information repository 227. In some implementations, the automated test software 230 comprises one or more test tools that perform static analysis, determine software metrics, generate test scripts, and execute regression testing. For example, the automated test software 230 can be C/C++ TEST provided by PARASOFT® of Monrovia, Calif. In some implementations, the automated test software 230 can analyze program instructions of the software platform under test 107 to identify the applications 231 and generate unique identifiers. The automated test software 230 can also analyze the applications 231 in the software platform under test 107 to identify new functions and modified functions by comparing them with prior versions of the applications. Additionally, the automated test software 230 can analyze the program instructions of the applications 231 to identify dependencies between applications by determining other applications from which they receive information and to which they provide information. Based on the dependencies, the automated test software 230 can determine the degree of the changes to the applications. In some implementations, the automated test software 230 can determine the degree of changes based on whether the quantity of applications dependent on an application exceeds one or more threshold. For example, the automated test software 230 can determine the degree of changes to be small, medium, or large based on whether they affect less than or equal to three, more than three but less than 10, or greater than or equal to 10 applications, respectively.

The test analysis module 233 can be program instructions for automatically generating the test analysis data structure 109 specific to the software platform under test 107. In some implementations, generating the test analysis data structure 109 comprises populating a non-specific template with information describing the applications 231 in the software platform under test 107. As illustrated in FIG. 2B, in some implementations, the test analysis module 233 obtains the information describing the applications 231 from the software platform under test information repository 227, as described above. In some other implementations, the test analysis module 233 can also obtain the information describing the applications 231 as an output from the automated test software 230. In some implementations, the non-specific template includes categories corresponding to different ranges of user-interactions and the test analysis module 233 places the application identifiers in the categories based on the respective user-interactions of the applications, as indicated by the software platform under test information repository 227 and the automated test software 230. The categories can be ordered with regard to one another in the test analysis data structure 109 based on their respective categories. Additionally, as shown in FIG. 2B, in some implementations the test analysis module 233 can associate the applications 231 with the information indicating whether an application has changed and, if so, the type of change (e.g., new functionality or modified functionality). Further, the test analysis module 233 can associate the corresponding degree of change with the individual applications 231. Further, in some implementations, the test analysis module 233 can determine weights for the applications based on the relative positions of their respective categories in the test analysis data structure 109.

The test engine 235 can include program instructions for automatically determining scope, resources, and duration for testing the software platform under test 107 based on the test analysis data structure 109 and the test repository 223. As shown in FIG. 2B, in some implementations the test engine 235 can determine the scope based on a total quantity of test scripts for testing the applications 231 identified, as indicated in the test analysis data structure 109 from their respective degrees and types of change indicated in the test analysis data structure 109. Additionally, the test engine 235 can determine resources and scheduling based on the information describing constraints and availability of human resources computing resources, schedules thereof, and other suitable information stored in the test repository 233. Further, the test engine 235 can limit the quantity of test scripts used for testing the software platform under test 107 based on the weights indicated in the in the test analysis data structure 109.

The automated test execution module 237 can include program instructions for automatically executing the test of the software platform under test 107 by executing test scripts designated by the test engine 235. As shown in FIG. 2B, in some implementations the automated test execution module 237 retrieves and executes test scripts for the applications 231 determined based on the test analysis data structure 109 using respective computing resources of the test system 105 to produce the test results 229, which can include information describing the test scope, test resources, and test duration. In some implementations, as illustrated in FIG. 2B, the automated test execution module 237 determines whether a particular test script is an automated test script at block 251. If not (e.g., block 251 is "No"), then at block 253, the automated test execution module 237 can queue the test script for manual execution in accordance with the based on the information provided by the test engine 235. On the other hand, if a test script is an automated test script, then at block 255 the automated test execution module 237 can schedule resources and execute the test script based on the information provided by the test engine 235.

Figure 3A:
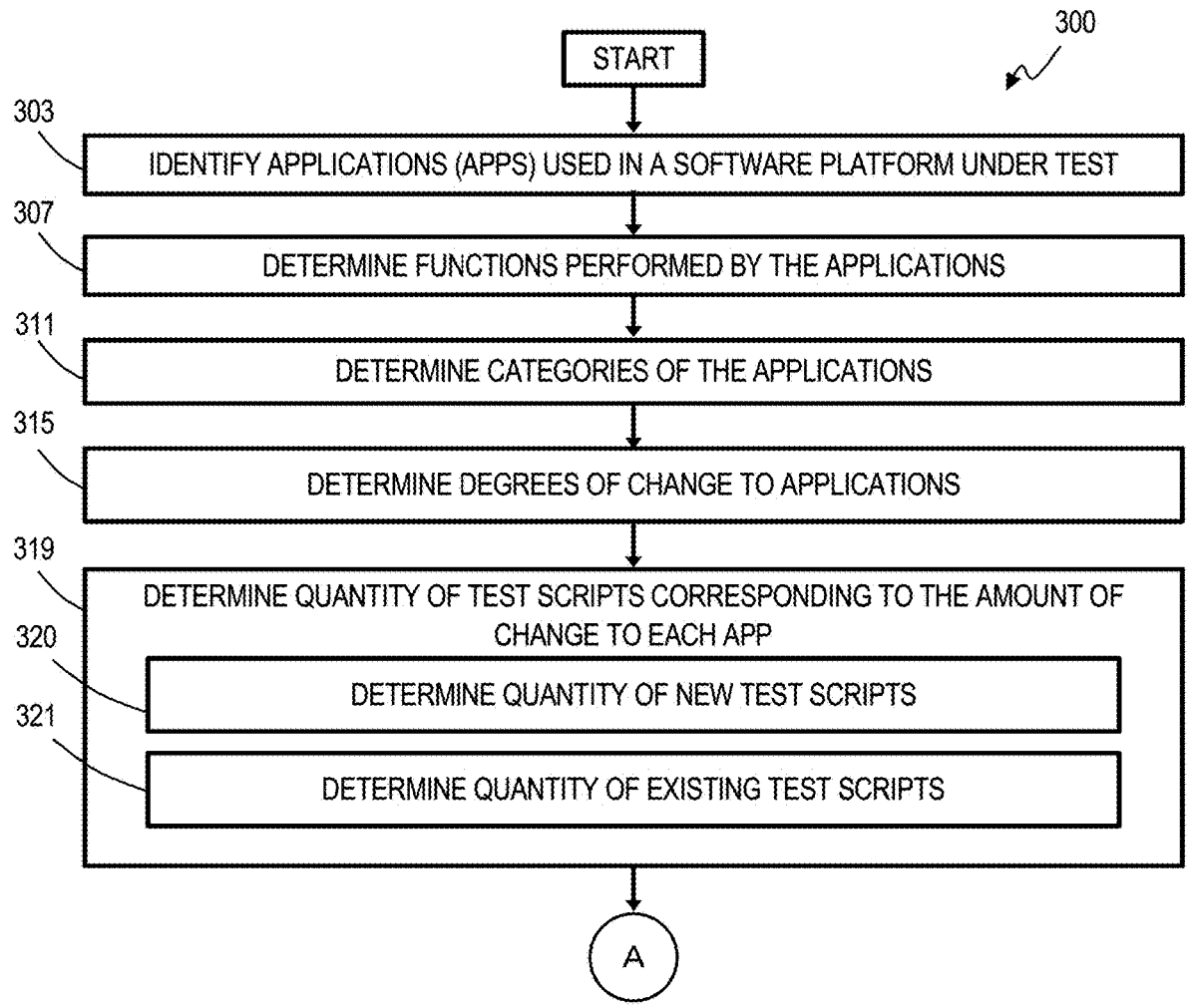
FIGS. 3A and 3B show a flow block diagram illustrating an example of a process in accordance with aspects of the present disclosure.
Figure 3B:
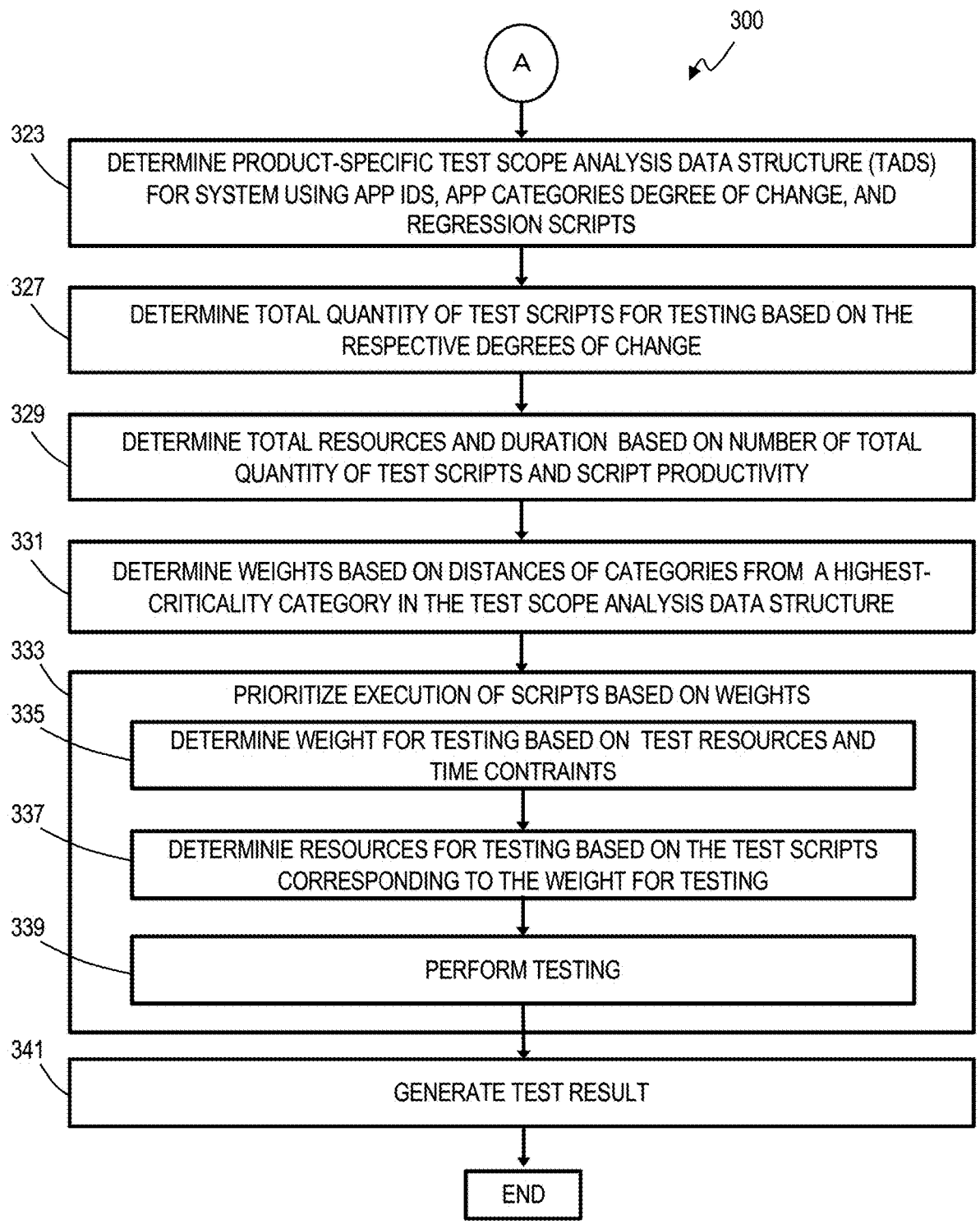

The flow diagrams in FIGS. 3A and 3B illustrate an example of the functionality and operation of possible implementations of systems, methods, and computer program products according to various implementations consistent with the present disclosure. Each block in the flow diagrams of FIGS. 3A and 3B can represent a module, segment, or portion of program instructions, which includes one or more computer executable instructions for implementing the illustrated functions and operations. In some alternative implementations, the functions and/or operations illustrated in a particular block of the flow diagram can occur out of the order shown in FIGS. 3A and 3B. For example, two blocks shown in succession can be executed substantially concurrently, or the blocks can sometimes be executed in the reverse order, depending upon the functionality involved. It will also be noted that each block of the flow diagram and combinations of blocks in the block can be implemented by special purpose hardware-based systems that perform the specified functions or acts, or combinations of special purpose hardware and computer instructions.

FIG. 3A shows a flow block diagram illustrating an example of a process 300 for determining a scope, resources, and duration for testing a software product (e.g., software platform under test 107) in accordance with some implementations consistent with the present disclosure. At block 303, a system (e.g., test system 301 executing automated test software 230) can identify applications (e.g., applications 231) used in the software product. The identifiers can be semantic, numeric, or alphanumeric terms that uniquely identify individual applications used in the system with respect to other applications in the system. In some implementations, the system can obtain identifiers via a static analysis of the applications using automated test software (e.g., automated test software 230) In some implementations, the system can obtain information describing the applications from a test repository (e.g., software platform under test information repository 227) generated for the software product generated by the automated test software or other suitable source.

At block 307, the system (e.g., executing automated test software 230) can determine, for the applications identified at block 303, respective functions performed be the individual applications. In some implementations, the system can determine the functions of the applications using automated test software (e.g., automated test software 230), an information repository (e.g., software platform under test information repository 227), or other suitable source. For example, the automated test software may extract functionality from header information of the source code of applications or from metadata associated with the application.

At block 311, the system (e.g., executing automated test software 230) can determine respective categories for the applications identified at block 303. In some implementations, the system categorizes the applications based on their functions using predetermined categorization information (e.g., stored in software platform under test information repository 227) that maps various functions of applications to respective categories corresponding to their relative criticality to the software platform under test. The categories can correspond to criticality of the functions performed by the applications determined at block 307 to core and vital functions of the software product. In some implementations, a most-critical application may be one in which having current, correct, secure, and/or uncorrupted information extremely important to a core or vital functionality of the software product. A low-criticality application may be one in which outdated, incorrect, ad/or imperfect data, while undesirable, does not impact the core functionality of the software product. For example, it may be highly-critical to the core function of a banking software platform to output timely and errorless information from a central accounts database. As such, the system may prioritize test scripts for applications testing the central accounts database in the categories. By comparison, it may not be critical to the core function of a banking software platform to output errorless information on a landing page of an automated-teller machine. As such, the system may deprioritize test scripts for applications testing the user-interfaces in the categories.

In a non-limiting example of such banking software platform, a first, least-critical category be "external user touch points," which include applications used in customer-initiated transactions with the banking software platform. A second, more critical category can be "internal user touch points," which include applications used internally by employee transactions with the banking software platform. A third, even more critical category can be "databases," which include applications used for online databases of the banking software platform. A fourth, yet even more critical category can be "formatting transactions for batch updates," which can include applications for converting online transactions for batch updates of the banking software platform. A fifth, most critical category can be "posting outputs," which can include applications for posting applications and batch feeds from the banking software platform. A sixth, less critical category can be "legal and regulatory," which can include applications used for reporting legal and regulatory information from the banking software platform. A seventh, even less critical category can be "management information system feeds and reporting," which can include application for providing management information system feeds and reporting from the banking software platform. An eighth, yet even less critical category can be "internal business," which can include applications used for performing internal business function by the banking software platform. A ninth, least critical category can be "external vendor and customer," which can include applications used by external vendors and customers of the banking software platform.

At block 315, the system (e.g., executing automated test software 230) can determine respective degrees of change made to the applications identified at block 303. In some implementations, the degrees of change can be set to one of several levels, such as: small, medium, and large. In some implementations, the information repository includes information indicating the respective degrees of change for the applications. In some implementations, the automated test application can use static analysis of the software platform under test to determine the degrees of change by, for example, determining a quantity of new functions, a quantity of modified functions, and a quantity of function calls made to the new and modified functions by other applications. As discussed above, the degrees of change can correspond to a quantity of test scripts that will be performed on the software platform under test by the testing. In some implementations, a small change can correspond to a minimum quantity of test scripts for testing core functionality without which the software platform under test could not perform its primary function. For example, in a banking platform, the minimum quantity of test scripts verify test cases for the software platform under test posting a predetermined set of basic transactions users commonly perform with the system under test. A medium change can correspond to an expanded quantity of test scripts greater than the minimum quantity for testing the functionality of the software platform under test, but may exclude those that verify non-critical functions of the software platform under test. A large change can correspond to a largest set of test scripts that test the full functionality of the software platform under test, including the minimum and expanded test scripts, as well as those that verify the non-critical functions.

Figure 5:
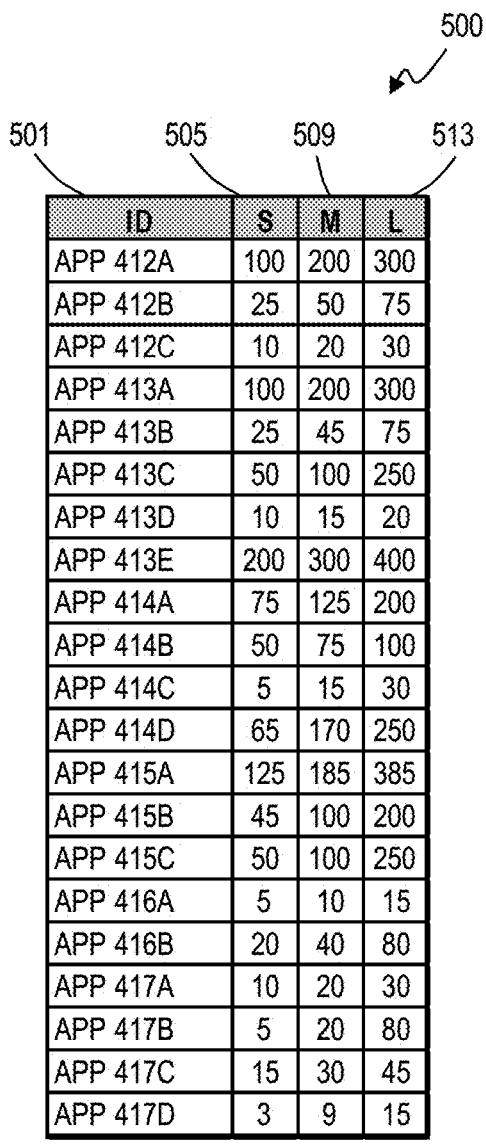
FIG. 5 shows table illustrating an example of a test script data structure in accordance with aspects of the present disclosure.

At block 319, the system (e.g., executing test engine module 235) can determine, for the applications identified at block 303, a quantity of test scripts corresponding to the respective level of change determined at block 315. Determining the quantity of test scripts includes determining a quantity of new test scripts corresponding to functions added to the applications at block 320, and a quantity of regression test scripts corresponding to modified functions of the applications at block 321. In some implementations, the test repository can include information specifying a quantity of test scripts corresponding to the respective degree of changes in the software platform under test repository, such as illustrated in FIG. 5.

Continuing the process 300 to FIG. 3B, as indicated by off-page connector "A," at block 323 the system (e.g., executing test analysis module 233) can determine a test analysis data structure specific to the software product using the applications identified at block 303, the categories determined at block 311, the degrees of change determined at block 315, and the quantity of scripts determined at block 319. In some implementations, determining the system-specific test analysis data structure includes populating a non-specific template with the applications identifiers of the software platform under test based on the corresponding categories of the applications in the template. For example, the system can populate a user-interface category of the template with applications identified or specified as user-interface applications, an information storage category of the template with applications identified or specified as information storage applications, an information processing category of the template with applications identified or specified as information processing applications; and an system output category of the template with applications identified or specified as systems output applications. Further, for the individual applications in their respective categories of the template, the system can associate the degree of change and quantity of test scripts corresponding to the degree of change.

At block 327, the system (e.g., executing test engine 235) can determine a total quantity of test scripts for testing the software platform under test based on the quantities of the test scripts determined at block 319. In some implementations, the system determines the quantity of test scripts by summing the quantities of test scripts determined for the applications at block 319.

At block 329, the system (e.g., executing test engine 235) can determine a total quantity of resources and duration for the testing based on the total quantity of test scripts determined at block 327. In some implementations, the system determines the resources and duration based on information in the test repository, which can associate resource and scheduling constraints with the individual test scripts. It is understood that the test repository can indicate different quantities and types of recourses for the different applications. Based on the resource requirements, the test system (e.g., executing test engine 235) can determine the total resources for the total quantity of test scripts determined at block 327.

Figure 4:
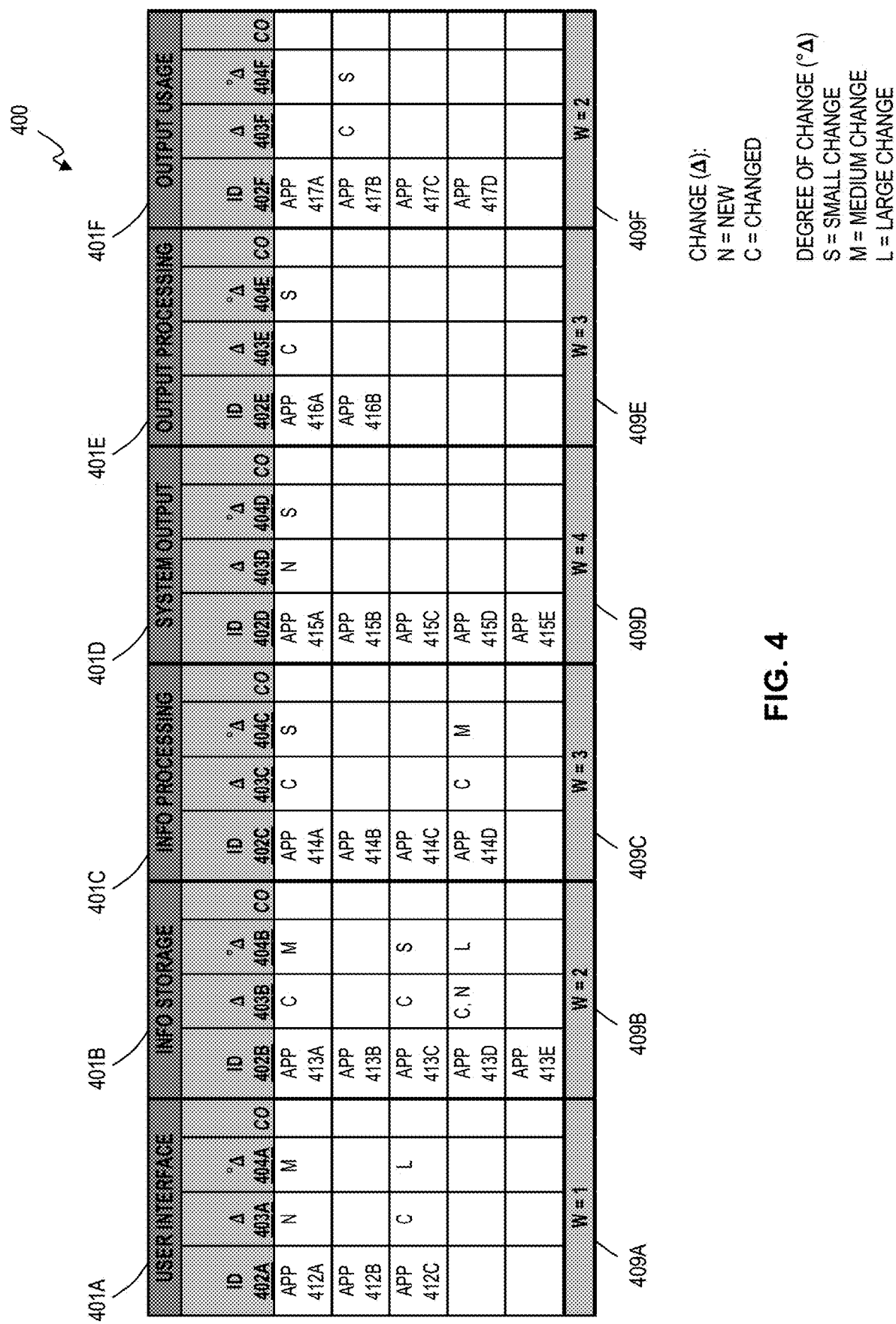
FIG. 4 shows table illustrating an example of a test and analysis data structure in accordance with aspects of the present disclosure.

At block 331, the system (e.g., executing test engine 235) can determine, for the applications identified at block 303, respective weights based on distances of the respective category from one of the applications in a system highest-criticality category in the test scope analysis data structure generated at block 323. As described above, the system can determine weights based on a positions in the test analysis data structure relative to the highest-criticality category, such that the highest-criticality category has the greatest weight. For example, as illustrated in FIG. 4, the test scope analysis data structure can include a logical arrangement of four (4) categories of front-end applications (e.g., categories 401A, 401B, 401C, and 401D), including a highest-criticality category (e.g., category 401D, "system output applications"). The system can assign the highest-criticality category a greatest weight, such as four (4). Further, the system can assign incrementally decreasing weights to the other front-end categories based on the logical position in the test analysis data structure, such that lowest-criticality category (e.g., category 401A, "user interface applications) is assigned the lowest weight. For example, the system can assign a weight of 1 first category including user-interface applications, a weight of 2 to a second category adjacent to the first category including information storage and retrieval applications, a weight of 3 to a third category adjacent to the second including information processing applications, and a weight of 4 to a fourth category adjacent to the third category including system output applications. It is understood that other suitable categories, quantities of categories, weights, and weight ranges can be used.

In some implementations, the test analysis data structure can also determine respective weights for applications that use information from the back-end applications (i.e., downstream applications) based on their relative distance from the system highest-criticality category in the test scope analysis data structure. For example, in addition to the categories described above, the test analysis data structure can include a fifth category including applications that analyze legal and regulatory compliance using information from applications in the system highest-criticality category, a sixth category including applications that store the information determined by the legal and regulatory compliance applications, and a seventh category including applications that perform user-interactions using the stored legal and regulatory compliance information. In such implementations, the system can assign a weight of 3 to the legal and regulatory compliance category based on its adjacency to the highest-criticality category, a weight to 2 to the legal and regulatory information storage applications adjacent to the legal and regulatory compliance analysis applications; and a weight of 1 to the user-interaction applications adjacent to the legal and regulatory storage applications.

At block 333, the system can prioritize execution of the test scripts determined at block 327 based on the weights determined at block 331. In some implementations, prioritizing the execution of the test scripts includes, at block 335, determining a minimum weight for testing the software platform under test based on available test resource and time constraints. In some implementations, the system can receive the minimum weight from a software engineer (e.g., using I/O device 207). In some implementations, the system (e.g., executing test engine 235) can automatically determine the minimum weight based on one or more predetermined constraints stored in the test repository. The test resource constraints can include manpower constraints, and/or computing resources constraints. The time constraints can include a time limit, an amount of computing resources, and an amount of human resources. For example, a test engineer may input information into the system indicating that testing is constrained to 120 hours. Using this quantity, the system can determine that a minimum weight of 3 in the test analysis data structure corresponds to a quantity of test scripts that do not use more than 120 hours to execute.

In some implementations, prioritizing the execution of the test scripts also includes, at block 337, determining resources and a schedule for testing the software platform under test based on the quantity of test scripts determined at block 327 corresponding to the minimum weight selected at block 333. In some implementations, determining the resources involved excludes those corresponding to test scripts of applications in categories having weights greater than the minimum weight determined at block 333. For example, a minimum weight of 3 can exclude test scripts of in categories having weights lower than 3 (e.g., user interface applications, information storage applications, legal and regulatory information storage applications, and legal and regulatory user-interaction applications) from the testing of the software platform under test.

In some implementations, prioritizing the execution of the test scripts also includes, at block 339, (e.g., executing automated test execution module 237) performing the testing using the resources determined at block 335 and the test scripts determined at 327. In implementations, the test can include, for example, performance testing and online testing of web based applications; automated interface testing of host applications; automation of batch transactions to posting engines; and automated validation of application data conversion. In some implementations, software engineers can iteratively scale the testing and the resources used therein based on the weighting. For example, to meet external requirements (e.g., budget and schedule), the software engineers can limit the testing to the categories of applications having weights 3 and 4. Accordingly, the system may only execute test scripts for the selected categories. By doing so, implementations in accordance with the present disclosure provide a technical solution for determining the resources and the test script, and resources involved in such limited testing, rather than making an ad hoc estimate. In some implementations, the system iteratively performs the one or more of blocks 335-339 to determine on optimal set of test script for execution for a set of given test resource and time constraints. For example, the system can use functions such as "Goal Seek" or "Solver" included in MICROSOFT EXCEL provided by MICROSOFT CORP. of Redmond, Wash. to determine an optimal mix of test scripts based on the weights of the categories, and the test resource and constraints. At block 341, the system can generate a test result (e.g., test result 229) indicating the applications that passed and failed testing based on the testing performed at block 339.

FIG. 4 shows a table illustrating a data structure 400 representing an example of a test analysis data structure corresponding to a particular software platform under test (e.g., software platform under test 107) in accordance with aspects of the present disclosure. The test analysis data structure and the information contained therein can be the same or similar to that previously describe above (e.g., test analysis data structure 109). The data structure 400 comprises a logical table having a plurality of logical columns including an ordered series of categories 401A, 401B, 401C, 401D, 401E, and 401F. In some implementations, the categories 401A-401F correspond to different types of functions performed by the applications. For example, categories 401A, 401B, 401C, 401D, 401E, and 401F can include, respectively, user interface applications, information storage applications, information processing applications, system output applications, output analysis applications, and output usage applications. The logical arrangement of the categories 401A, 401B, 401C, 401D, 401E, and 401F can be based on the criticality of an application to affect core or vital functionality of the software platform under test. In some implementations, applications of a software product generating outputs from the software platform under test can have the greatest criticality of an application to affect the output of the software platform under test. Applications with progressively lower criticality to affect the output are located at progressively greater distances from the output applications in the test analysis data structure.

In accordance with aspects of the present disclosure, the categories 401A, 401B, 401C, 401D, 401E, and 401F can be assigned respective weights 409A, 409B, 409C, 409D, 409E, and 409F based on distances of the individual categories from the system output category 401D. As shown in FIG. 4, category 401A, including user interface applications, can have a weight 409A of 1. The weights 409B, 409C, 409D of adjacent categories 401B, 401C, and 401D can be incrementally increase from the user-interface category 401A and the system output category 401D. For example, weights 409A, 409B, 409C, 409D corresponding to categories 401A, 401B, 401C, 401D can be 1, 2, 3, and 4, respectively. Additionally, in some implementations, the weights 409D, 409E, and 409F of adjacent categories 401D, 401E, and 401F can incrementally decrease from the system output category 401D to the output usage category 401F. For example, weights 409D, 409E, and 409F corresponding to categories 401D, 401E, and 401F can be 4, 3, and 2, respectively.

In accordance with aspects of the present disclosure, the categories 401A-401F include a plurality of logical rows associating respective applications with information indicating whether individual applications have changed, a type of change (e.g., new function or application, and a changed function or application), and a degree of change (e.g., small, medium, or large). For example, category 401A, corresponding to user-interface applications, includes applications 412A, 412B, and 412C; category 401B, corresponding to information storage applications, includes applications 413A, 413B, 413C, 413D, and 413E, category 401C, corresponding to information processing applications, includes applications 414A, 414B, 414C, and 414D; category 401D, corresponding to system output applications (e.g., posting application), includes applications 415A, 415B, 414C, 415D, and 415E; category 401E, corresponding to system output proceeding applications (e.g., fraud detection and compliance applications), includes applications 416A and 416B; and category 401F, corresponding to system output usage applications (e.g., posting application), includes applications 415A, 415B, 414C, 415D, and 415E.

The individual categories 401A-401F include information regarding their respective applications, including: application identifiers ("ID") 402A-40F, modification information 403A-403F, and a degree of change 404A-404F. As previously described above, the applications identifiers 412A-417D can be numeric, alphabetic, or alphanumeric character strings that uniquely identify their corresponding applications. The modification indicators 403A-403F indicate whether the modification is includes a change in a preexisting functionality of the application ("C") and/or whether the modification includes new functionality added to the application ("N"). The degree of change information 404A-404F indicate an amount of change for the modified applications. In in some implementations, the amount of change is relative value, such as small ("S"), medium ("M"), and large ("L"). It is understood that the amount of change can instead be an absolute value or a percentage value.

FIG. 5 shows a table depicting an example of a data structure 500 including test script counts in accordance with aspects of the present disclosure. The data structure 500 associates applications 412A-417D in the software platform under test with corresponding quantities of test scripts. In some implementations, the information of the data structure 500 can indicate quantities of test scripts corresponding to the applications in the software platform under test. The quantities in the data structure can be provided by software engineers, obtained from an information repository (e.g., test repository 223), or determined by the automated test software (e.g., automated test software 230). In some implementations, the quantities in the data structure 500 indicate quantities of test scripts corresponding to the degree of changes to the applications. For example, column 501 of the data structure includes the identifications of the applications, which can be the same as those previously described above. Columns 505, 509, and 513 indicate respective quantities of test scripts for small, medium, and large changes to corresponding applications. For example, APP 412A in column 501 corresponds to 100 test scripts in column 505 for small changes to the application, 200 test scripts in column 509 for medium changes to the application, and 300 test scripts in column 513 for large changes to the application. It is understood that the quantities of test scripts are provided for the sake of example and that data structure can indicate other suitable quantities instead. Additionally, it is understood that the information included in the data structure 500 can be incorporated in the data structure 400, or divided among different data structures stored at different locations, such as within the respective applications.

Systems, methods and computer program products using test analysis data structures in accordance with aspects disclosed herein provide multiple improvements for computing systems used to perform software testing. First, the systems, methods, and computer program products allow for computing systems to more efficiently determine optimal resources for testing software based on weights determined using the arrangement of the test analyses data structures. Second, the systems, methods and computer program provides more flexibility in varying the resources used in testing software by the system by allowing varying of the scope using the weights established by the structure of the test analyses data structures. Third, the systems, methods and computer program provide for increased efficiency of the software testing by determining the optimal resources for various test scopes by avoiding unnecessary inclusion of test scripts outside the test a give test scope and the erroneous exclusion of test scripts within the test scope.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

What we claim is:

1. A method for determining a duration and resources for testing a software product, the method comprising:
    determining, by a computing system, respective functions performed by a plurality of applications comprising the software product;
    determining, by the computing system, respective categories of the plurality of applications based on the respective functions of the plurality of applications, wherein the categories are included in a predetermined set of categories including a lowest-criticality category and a highest-criticality category;
    determining, by the computing system, respective degrees of change to the plurality of applications;
    determining, by the computing system, respective test scripts corresponding to the degrees of change to the plurality of applications;
    generating, by the computing system, a test scope analysis data structure based on the respective categories and the degrees of change to the plurality of applications, the test scope analysis data structure comprising a logical table including a plurality of logical columns intersecting a plurality of logical rows defining a plurality of logical cells, wherein:
        the plurality of logical columns respectively identify the set of categories in a predetermined order from the lowest-criticality category and the highest-criticality category,
        individual columns of the plurality of logical columns comprise a plurality of sub-columns identifying respective application identifiers of the plurality of applications and respective degree of change indicators of the plurality of applications, and
        the plurality of logical rows in the plurality of logical columns correspond to the plurality of sub-columns, including the application identifiers and the degree of change indicators;
    determining, by the computing system, respective weights corresponding to the plurality of logical columns based on respective distances of the plurality of categories from the highest-criticality category in the plurality of logical columns;
    determining, by the computing system, a set of the test scripts for testing the software product based on the respective weights, respective test scripts, and the respective degree of change indicators of the plurality of applications; and determining, by the computing system, the resources for testing the software product based on the set of test scripts.

2. The method of claim 1, wherein determining the categories comprises determining the categories based on respective criticalities of functions performed by the plurality of applications.

3. The method of claim 1, wherein determining degrees of change to the plurality of applications comprises determining the degrees of change from a set including a small change, a medium change, and a large change.

4. The method of claim 3, wherein:
the small change corresponds to a first quantity of test scripts that only test critical functionality of the software product;
the medium change corresponds to a second quantity of test scripts comprising first regression test scripts and the first quantity of test scripts; and
the large change corresponds to a third quantity of test scripts comprising the second quantity of test scripts and a second quantity of regression test scripts.

5. The method of claim 1, wherein determining the test scripts comprises:
determining new test scripts corresponding to new functions added to the plurality of applications; and
determining existing test scripts corresponding to modified functions of the plurality of applications.

6. The method of claim 1, wherein:
the weights in the test scope analysis data structure decrease from the highest-criticality category to the lowest-criticality category.

7. The method of claim 6, wherein:
the highest-criticality category corresponds to a greatest weight in the test scope analysis data structure.

8. The method of claim 7, wherein determining the set of test scripts comprises determining a plurality of the test scripts in the test scope analysis data structure corresponding to a minimum weight of the respective weights selected for the testing of the software product.

9. A system for determining a duration and resources for testing a software product comprising a plurality of applications, the system comprising:
a processor; and
a computer-readable data storage devices storing program instructions that when executed by the processor, control the system to:
determine respective functions performed by the plurality of applications comprising the software product;
determine respective categories of the plurality of applications based on the respective functions of the plurality of applications;
determine respective degrees of change made to the plurality of applications;
generate a test scope analysis data structure, the test scope analysis data structure comprising a logical table including a plurality of logical columns intersecting a plurality of logical rows defining a plurality of logical cells, wherein:
the plurality of logical columns respectively identify a plurality of categories, wherein the plurality of categories are included in a predetermined set of categories including a lowest-criticality category and a highest-criticality category;
individual columns of the plurality of logical columns comprise a plurality of sub-columns identifying respective application identifiers of the plurality of applications and respective degree of change indicators of the plurality of applications; and
the plurality of logical rows in the plurality of logical columns correspond to the plurality of sub-columns, including the application identifiers and the degree of change indicators;
determine respective test scripts corresponding to the degrees of change to the plurality of applications;
determine respective weights corresponding to the plurality of logical columns based on respective distances of the plurality of categories from the highest-criticality category in the plurality of logical columns;
determine a set of the test scripts for testing the software product based on the respective weights, respective test scripts, and the respective degree of change indicators of the plurality of applications; and
determine the resources for testing the software product based on the set of test scripts.

10. The system of claim 9, wherein determining the categories comprises determining the categories based on respective criticalities of functions performed by the plurality of applications.

11. The system of claim 9, wherein the predetermined set of categories comprises, an input category, a storage and retrieval category; an information processing category; and an output category.

12. The system of claim 9, wherein determining the degrees of change to the plurality of applications comprises determining the degrees of change from a set including a small change, a medium change, and a large change.

13. The system of claim 12, wherein:
the small change corresponds to a first quantity of test scripts that only test critical functionality of the software product;
the medium change corresponds to a second quantity of test scripts comprising first regression test scripts and the first quantity of test scripts; and
the large change corresponds to a third quantity of test scripts comprising the second quantity of test scripts and a second quantity of regression test scripts.

14. The system of claim 9, wherein determining the test scripts comprises:
determining new test scripts corresponding to new functions added to the plurality of applications; and
determining existing test scripts corresponding to modified functions of the plurality of applications.

15. The system of claim 9, wherein:
the respective weights in the test scope analysis data structure increase from the lowest-criticality category to the highest-criticality category; and
the highest-criticality category corresponds to a greatest weight in the test scope analysis data structure.

16. The system of claim 15, wherein determining the set of test scripts comprises determining a plurality of the test scripts in the test scope analysis data structure corresponding to a minimum weight of the respective weights selected for the testing of the software product.

* * * * *